United States Patent [19]

Higashinakagawa et al.

[11] 3,744,041

[45] July 3, 1973

[54] MAGNETIC THIN FILM MEMORY ELEMENTS AND METHOD OF MANUFACTURING THE SAME

[75] Inventors: Iwao Higashinakagawa, Kawasaki; Takashi Nakagawa, Tokyo; Takenobu Ogawa, Kawasaki; Syozo Takeno, Yokohama; Nobuaki Yasuda, Zushi, all of Japan

[73] Assignee: Tokyo Shibaura Electric Co., Ltd., Kawasaki-shi, Japan

[22] Filed: July 28, 1970

[21] Appl. No.: 58,797

[30] Foreign Application Priority Data

July 30, 1969 Japan .................................. 44/59781

July 30, 1969 Japan .................................. 44/59793

[52] U.S. Cl. 340/174 BC, 340/174 M, 340/174 NA, 340/174 PW, 340/174 TF, 340/174 VA

[51] Int. Cl. ......................... G11c 11/04, G11c 11/14

[58] Field of Search ................. 340/174 BC, 174 TF

[56] References Cited

UNITED STATES PATENTS

| | | | |
|---|---|---|---|
| 3,456,247 | 7/1969 | English | 340/174 BC |
| 3,483,534 | 12/1969 | Castellani et al. | 340/174 BC |

OTHER PUBLICATIONS

Publication I–IEEE Transactions on Magnetics, Vol. Mag–3; No. 4; Dec. 1967 pg. 635–639.

*Primary Examiner*—James W. Moffitt
*Attorney*—Flynn & Frishauf

[57] ABSTRACT

A magnetic thin film memory element including word lines and digit lines spatially intersecting at right angles is prepared by continuously forming the digit line unit on a heat resistant flexible insulator sheet, and perfectly contacting the digit line unit to a separately prepared word line unit.

7 Claims, 7 Drawing Figures

MAGNETIC THIN FILM MEMORY ELEMENTS AND METHOD OF MANUFACTURING THE SAME

BACKGROUND OF THE INVENTION

This invention relates to a magnetic thin film memory element, and more particularly to a magnetic thin film memory element utilizing a flexible insulator sheet and a method of manufacturing the same.

The prior art magnetic thin film memory element in the form of a flat sheet has been prepared by forming digit lines, a magnetic film, word lines and the like on a substrate of insulator or metal with an insulating layer by various precision working techniques such as vapor deposition, photoetching and electroplating. In this manner, since one memory element is produced as a single unit, a memory element which contains a defective portion must be discarded even if the area of such defective portion is extremely small, thus decreasing the available percentage and increasing the cost of manufacturing.

It is an object of this invention to provide a novel magnetic thin film memory element and method of manufacturing the same without accompanying above described difficulty.

SUMMARY OF THE INVENTION

According to one aspect of this invention there is provided a magnetic thin film memory element comprising a first unit including a heat resistant flexible insulator sheet and thin magnetic film applied thereon. A second unit is then connected to the first flexible unit to form a memory device.

In accordance with another aspect of this invention there is provided a method of manufacturing a magnetic thin film memory element comprising the steps of forming a plurality of first conductor strips on one surface of a heat resistant flexible insulator sheet, surrounding said conductor strips with magnetic thin films, applying a conductor substrate on the opposite surface of said insulator sheet whereby to form a digit line unit; forming a plurality of second conductor strips on a magnetic keeper substrate, applying an insulator film on said second conductor strips whereby to form a word line unit; and perfectly contacting said digit line unit and said word line unit into a unitary structure with said first and second conductor strips intersected spatially and perpendicularly.

The flexible insulating material utilized in this invention is required to have sufficiently high heat resistance to withstand the heat of vapor deposition. Thus, preferred materials are films of polyimide resin, Myler, Teflon (trade marks) and the like. To provide required magnetic characteristics of the magnetic thin film deposited on the film, the surface of the film must be flat and smooth.

Since at present the effect of the material and surface condition of the substrate upon the growth of the vapor deposited film is not yet theoretically analyzed even if a sheet material that satisfies the above described conditions required of the substrate, the condition of vapor deposition required for producing magnetic thin films of the desired characteristics should be determined experimentally as described later in more detail.

DESCRIPTION OF THE PREFERRED EMBODIMENTS

To have better understanding of the invention, conditions required for satisfactorily depositing a magnetic thin film on an elongated flexible insulator sheet will first be considered.

Figure 1:
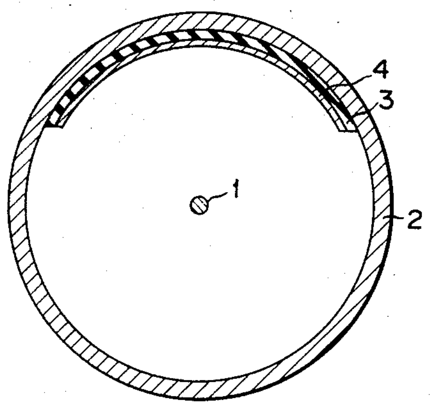
FIG. 1 is a plan view of a vapor deposition apparatus to explain the novel method of manufacturing a magnetic thin film sheet element.

As diagrammatically shown in FIG. 1 an elongated flexible insulator sheet 3 was secured on the inner surface of a cylindrical vapor deposition apparatus 2 having a source of vapor deposition 1 at the center thereof. A commercially available Capton film of 25 microns thick, (a polyimide resin film sold by E. I. Du Pont Co.) was used as the sheet 3. A magnetic thin film 4 was vacuum deposited in a magnetic field while maintaining film 3 at a preheating temperature of 300° C. Under these conditions, due to the difference in the thermal expansion of resin film 3 and magnetic film 4 the resin film 3 tends to flex about the longitudinal axis thereof. While the sheet 3 was maintained flat by holding it between two glass plates the B–H loop of the magnetic film 4 deposited on the sheet 3 was determined by utilizing the magnetic Kerr effect and it was found that the easy direction was displaced from the desired direction. It was also noted that the easy direction was also different depending upon the method of depressing the sheet by the glass plates and lacked reproduceability.

On the other hand, when the magnetic thin film was vacuum deposited in a magnetic field while maintaining the resin film at room temperature, the resin film flexed in the opposite direction to that wherein it was maintained at the preheating temperature of 300° C.

Based on the presumption that there will be a preheating temperature that will not cause the flexture of the film between room temperature and 300° C, we have carried out a number of experiments wherein the magnetic film was deposited under varying preheating temperatures of the resin film. As a result, when the magnetic film was vapor deposited at a preheating temperature of 96° C it was noted that the films maintained their flatness. However, when the same composition of the source of vapor deposition was used for the resin film as that for glass substrate it was found that the magnetic film deposited at 96° C has increased its coercive force Hc and anisotropy field H*k*. Furthermore, when the resin film was subjected to tension the B–H characteristic of the magnetic film was changed.

Figure 2:
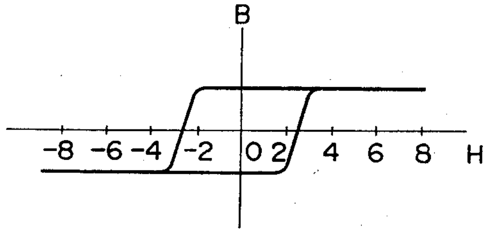
FIG. 2 shows a B–H characteristic curve of the element prepared by the apparatus shown in FIG. 1 along the easy direction.
Figure 3:
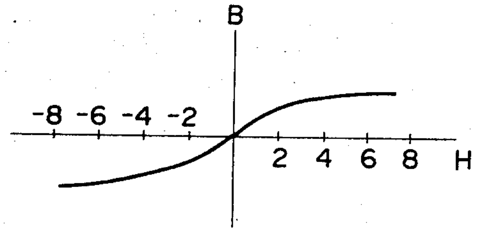
FIG. 3 shows a B–H characteristic curve of the element along the hard direction.

Then experiments were continued by varying the composition of the source of vapor deposition, or the ratio of *Ni* to *Fe* while maintaining the preheating temperature at a fixed value of 96° C until values of H*c* and H*k* close to those of the source for the glass substrate were obtained. FIGS. 2 and 3 illustrate B–H characteristic curves of the magnetic film produced under these conditions. FIG. 2 shows the B–H characteristic curve along the easy direction whereas FIG. 3 that along the hard direction which shows that the magnetic film has coercive oercive force H*c* of 2.3 oersteds and an anisotropy field of 3.0 oersteds. The result of analysis of this magnetic film showed a composition of N*i* 78 percent and F*e* 22 percent, but these are not the absolutely correct values in view of the accuracy of the analysis of the magnetic film. However it was noted that the configuration of the B–H characteristic curve did not change when tension was applied to the magnetic film while the B–H curve was determined by the Kerr effect, and that the configuration of the B–H curve was changed when the composition of the magnetic material was varied from that mentioned above. It is well known that the composition of Permalloy having a magnetostriction constant of zero consists of N*i* 81 percent and Fe 19 percent. From this it may be considered that the magnetic film prepared in the manner described above would have a composition close to the composition of N*i* 81 percent and F*e* 19 percent, despite the said values obtained by analysis.

According to this invention only satisfactory portions of the sheet material prepared as above described are cut and are bonded to metal substrates for the mirror image effect described later. Thereafter, a block of digit lines and a block of word lines are formed on the magnetic film by the well-known process and then a keeper is coated thereon to complete a memory element.

The preheating temperature of 96° C required to obtain a flat sheet material after vapor deposition of the magnetic film of course varies according to the thickness of the resin material. Accordingly when utilizing a resin film of different thickness it is necessary to find out the optimum preheating temperature by the same procedure as above described and then find out a particular composition of the source of vapor deposition which given the magnetic film manifesting the desired characteristics when deposited upon the resin film preheated to the optimum temperature.

When resin films of the different types are utilized it is necessary to find out the optimum preheating temperature essential to form flat configuration as well as the optimum composition of the source of vapor deposition.

When depositing the magnetic film 4 on the resin film 3 by mounting the resin film on the inner surface of cylindrical vessel 2 and by locating the source of vapor deposition 1 at the center thereof, inclination of the easy direction of the magnetic film 4 due to the incident angle effect can be avoided.

Thus by carefully inspecting the completed magnetic film and by cutting off defective portions it is possible to increase the yield of satisfacory products.

Figure 4:
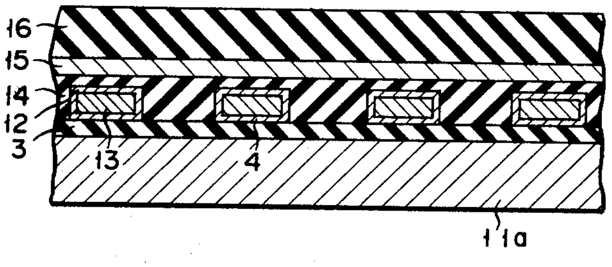
FIG. 4 shows a sectional view of a magnetic thin film memory element of the typical construction.

FIG. 4 shows a sectional view of a high density magnetic film memory element which comprises a metal substrate 11, an insulator film or layer 3 thereon, a plurality of parallel digit lines 13 each enclosed by magnetic films 4 and 12, a second insulator layer 14 covering the upper surfaces of digit lines 13 and filling the spaces between adjacent unit lines, word lines 15 disposed on the insulator layer 14 at right angles with respect to digit lines 13 and a magnetic keeper 16 covering word lines 15.

The purpose of the magnetic keeper 16 is to concentrate magnetic field immediately beneath the word line and to prevent current path in the substrate, which is the return path of the word current, from spreading outwardly from a region beneath the driving word line. Thus the magnetic and electric interferences to the adjacent bit become negligible or less pronounced with the keeper. For this reason the magnetic keeper is an indispensable component part in the high density memory element.

However, in the conventional memory element, the component parts are sequentially laminated on the metal substrate such as a metal covered with insulating layer of glass and then a keeper of rigid magnetic material such as ferrite is placed above the assembled component parts so that it is difficult to perfectly contact the word line unit having rigid magnetic keeper to the digit line unit including the rigid metal substrate.

Figure 7:
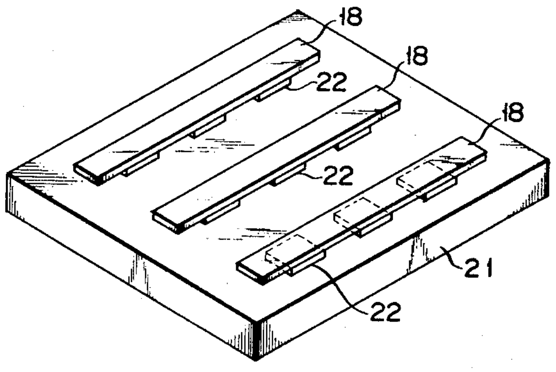
FIG. 7 shows a perspective view of another example of the word line unit.
Figure 5:
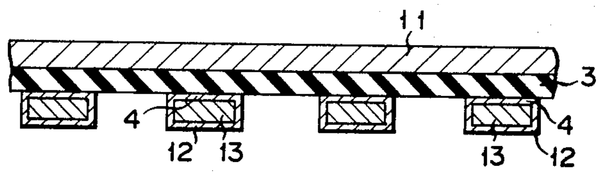
FIG. 5 is a sectional view of a portion of a digit line unit fabricated according to the method of this invention.
Figure 6:
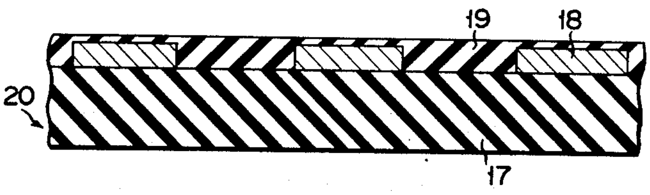
FIG. 6 is a sectional view of a portion of a word line unit fabricated according to the method of this invention.

However, by the improved construction shown in FIGS. 5 to 7 such difficulty can be obviated. FIG. 5 shows a digit line unit 11 including a heat resistant organic film 3, and FIG. 6 shows a word line unit 20 including a nonconductive high permeability magnetic keeper 17, the word line unit 20 being shown with respect to the digit line unit 11 at a position rotated 90° from its actual position.

The digit line unit 11 comprises a heat resistant organic film 3, for example, a polyimide film having a thickness of 25 microns, a layer of conductor 11*a*, for example copper, vacuum deposited on one surface of the organic film 3 and a block of digit lines 13 of conductor, copper for example, which are provided on the other surface of organic film 3 by a suitable precision working technique such as vapor deposition, etching or electroplating and are enclosed by magnetic films 4 and 12 having a thickness of 1,000 A.

The word line unit 20 is prepared by polishing to flat one surface of a substrate 17 of high permeability material, for example ferrite, applying a copper layer to the polished surface by vapor deposition and electroplating and then etching the copper layer to form spaced apart parallel stripes 18 acting as word lines. Word lines 18 are covered by a layer of insulating resin 19 having a flat surface slightly above the upper surface of the word lines 18.

The memory shown in FIG. 4 is completed by contacting together the digit line unit 11 shown in FIG. 5 and the word line unit 20 shown in FIG. 6 in a manner that word lines 18 are rotated 90° from the position shown in FIG. 6 so that they spatially intersect digit lines 13 at right angles.

In this embodiment, although substrate 17 functions as the magnetic keeper, as the organic film 3 carrying the digit lines 13 and metal layer 11*a* is flexible and pliable it can assure perfect contacting between word lines 18 and digit lines 13 thus providing a memory element of excellent characteristics.

In this manner, the element of this invention is first formed as two separate sections and then these sections are perfectly contacted together by a suitable contacting means into an integral unit. As a result where films are prepared by a batch system temporarally combining two sections and by contacting them together only where there are no defectives, it is not necessary to discard word line units containing the keeper and word lines, whereby it is possible to increase the available percentage of the products.

The available percentage can be increased further when a large quantity of digit line units 11 as shown in FIG. 5 is manufactured continuously in the same manner as metallized capacitors and by combining digit line units which have been proved to be satisfactory by tests with word line units thus providing good bits only.

FIG. 7 shows a perspective view of a modified embodiment of this invention. In this embodiment, instead of utilizing a continuous keeper 17 shown in FIG. 6, island shaped magnetic keepers 22 are formed at portions corresponding to each bit by vacuum depositing a layer of ferromagnetic material on a glass substrate 21 and then selectively etching portions of the ferromagnetic layer. Again word lines are designated by reference numeral 18. This modified element operates in the same manner as that shown in FIG. 6. It is to be understood that the glass substrate 21 may be substituted by a substrate of alumina ceramic and the like. Further, the magnetic keeper 17 shown in FIG. 6 may be provided with grooves.

What we claim is:

1. A magnetic thin film memory device using a heat resistant flexible insulator sheet comprising:

a word line unit including a plurality of word lines arranged in parallel with each other, and a magnetic keeper coupled to said word lines for concentrating a magnetic field immediately below said word lines;

a flexible digit line unit including a heat resistant flexible insulator sheet formed of polyimide resin film, a plurality of digit lines arranged in parallel with each other on one face of said polyimide resin film, an anisotropic magnetic thin film surrounding said digit lines to form closed flux paths, and a conductor layer deposited on the other face of said polyimide resin film, and means for connecting together said word and digit line units with said digit lines orthogonal to said word lines to form memory cells at their crossing points.

2. The memory device according to claim 1 wherein said magnetic keeper covers said word lines.

3. The memory device according to claim 1 wherein said polyimide resin film is about 25 microns thick.

4. A magnet thin film memory device using a heat resistant flexible insulator sheet comprising:

a word line unit including a magnetic keeper board made of ferrite, a plurality of word lines deposited one one face of said keeper and arranged in parallel with each other, and an insulating resin layer covering said word lines and covering portions of said one face of said keeper which are not deposited with said word lines;

a flexible digit line unit including a heat resistant flexible insulator sheet formed of polyimide resin film, a plurality of digit lines deposited on one face of said polyimide resin film, an anisotropic magnetic thin film surrounding said digit lines to form closed flux paths, and a conductor layer deposited on the other face of said polymide resin film, said digit lines being arranged in parallel with each other; and means for connecting together said word and digit line units with said digit lines orthogonal to said word lines to form memory cells at their crossing points.

5. The memory device according to claim 4 wherein said polyimide resin film is about 25 microns thick.

a flexible digit line unit including a heat resistant flexible insulator sheet formed of polimide resin film, a plurality of digit lines deposited on one face of said polyimide resin film, an anisotropic magnetic thin film surrounding said digit lines to form closed flux paths, and a conductor layer deposited on the other face of said polyimide resin film, said digit lines being arranged in parallel with each other; and means for connecting together said word and digit line units with said digit lines orthogonal to said word lines to form memory cells at their crossing points.

6. A magnetic thin film memory device using a heat resistant flexible insulator sheet comprising:

a word line unit including a glass substrate, a plurality of island shaped magnetic keepers deposited on that portion of said substrate corresponding to each bit storage location of said memory device, and a plurality of word lines arranged in parallel with each other on said keepers;

a flexible digit line unit including a heat resistant flexible insulator sheet formed of polimide resin film, a plurality of digit lines deposited on one face of said polyimide resin film, an anisotropic magnetic thin film surrounding said digit lines to form closed flux paths, and a conductor layer deposited on the other face of said polyimide resin film, said digit lines being arranged in parallel with each other; and means for connecting together said word and digit line units with said digit lines orthogonal to said word lines to form memory cells at their crossing points.

7. The memory device according to claim 6 wherein said polyimide resin film is about 25 microns thick.

* * * * *

UNITED STATES PATENT OFFICE
CERTIFICATE OF CORRECTION

Patent No. 3,744,041 Dated July 3, 1973

Inventor(s) Iwao HIGASHINAKAGAWA et al

It is certified that error appears in the above-identified patent and that said Letters Patent are hereby corrected as shown below:

Column 5, line 40, after "film" change "," to --;--;
line 48, change "A magnet" to --A magnetic--;
line 52, change "one one" to --on one--;

Column 6, delete lines 18-30.

Signed and sealed this 27th day of November 1973.

(SEAL)
Attest:

EDWARD M.FLETCHER,JR.
Attesting Officer

RENE D. TEGTMEYER
Acting Commissioner of Patents